(12) United States Patent
Ueno et al.

(10) Patent No.: US 6,972,314 B2
(45) Date of Patent: Dec. 6, 2005

(54) SILICONE RESIN COMPOSITION

(75) Inventors: Hideki Ueno, Chiba (JP); Hiroyuki Kayaki, Chiba (JP)

(73) Assignee: Henkel Corporation, Rocky Hill, CT (US)

( * ) Notice: Subject to any disclaimer, the term of this patent is extended or adjusted under 35 U.S.C. 154(b) by 46 days.

(21) Appl. No.: 10/656,119

(22) Filed: Sep. 8, 2003

(65) Prior Publication Data

US 2004/0127669 A1 Jul. 1, 2004

(30) Foreign Application Priority Data

Dec. 26, 2002 (JP) ........................................ 2002-377219

(51) Int. Cl.$^7$ .............................................. C08L 83/00
(52) U.S. Cl. ............................. 528/28; 528/34; 528/38; 525/452; 525/477; 525/474; 524/195; 524/588
(58) Field of Search .................. 524/195, 588; 525/452, 477; 528/28, 34, 38

(56) References Cited

U.S. PATENT DOCUMENTS

| | | | | |
|---|---|---|---|---|
| 2,941,956 | A | | 6/1960 | Bergstrom .................. 252/418 |
| 2,973,334 | A | | 2/1961 | Jack ........................... 260/33.6 |
| 3,334,067 | A | * | 8/1967 | Weyenberg .................. 528/17 |
| 3,689,454 | A | * | 9/1972 | Smith et al. .................... 528/17 |
| 4,214,066 | A | * | 7/1980 | Moretto et al. ............... 528/28 |
| 5,741,839 | A | | 4/1998 | Scheim ........................ 524/588 |

FOREIGN PATENT DOCUMENTS

| | | | |
|---|---|---|---|
| JP | 72-033279 | 12/1968 | |
| JP | 52-91100 | 8/1977 | ........... C08G/77/42 |
| JP | 54-17961 | 9/1979 | ........... C08G/83/04 |
| JP | 04-076058 | 3/1992 | ........... C08L/83/06 |
| JP | 10-007806 | 1/1998 | ......... C08G/77/452 |
| JP | 11-021443 | 1/1999 | ........... C08L/75/00 |
| JP | 2002-053759 | 2/2002 | ......... C08L/101/02 |
| JP | 2002-226708 | 8/2002 | ........... C08L/83/06 |
| JP | 2003-174025 | 6/2003 | ......... H01L/21/312 |

OTHER PUBLICATIONS

"Silicon Compounds", Kirk–Othmer's Encyclopedia of Chemical Technology, 3rd Edition. Hardman et al., 1982 pp. 944–947,960.*

Silicones, An Introduction to Their Chemistry and Applications, Freeman, G.G. Chapel River Press, 1962.*

Definition of viscosity as taken from Hawleys Condensed Chemical Dictionary, 14$^{th}$ Edition, 2002.*

Campbell, Tod W. and Smeltz, Kenneth C., *Carbodiimides, IV,* "High Polymers Containing the Carbodiimide Repeat Unit" 28 (1962).

* cited by examiner

*Primary Examiner*—Randy Gulakowski
*Assistant Examiner*—Marc S. Zimmer
(74) *Attorney, Agent, or Firm*—Steven C. Bauman

(57) ABSTRACT

This invention provides a silicone resin composition giving a silicone cured rubber exhibiting a higher elongation percentage as well as improved heat resistance, oil resistance and chemical resistance, which are particularly required for automobile applications. A silicone cured rubber meeting the above physical property requirements can be prepared by moisture-curing a silicone resin composition including 100 wt parts of (a) an OH-containing polysiloxane, 0.1 to 200 wt parts of (b) a carbodiimide and (c) an organosilicon crosslinking agent, or alternatively by thermally curing a silicone resin composition including 100 wt parts of (a) an OH-containing polysiloxane, 0.1 to 200 wt parts of (b) a carbodiimide and (d) an amino-containing silane.

9 Claims, No Drawings

SILICONE RESIN COMPOSITION

BACKGROUND OF THE INVENTION

1. Field of the Invention

This invention relates to a silicone resin composition and its cured products. In particular, it provides a silicone resin composition providing a cured product exhibiting a higher elongation percentage as well as improved heat resistance, oil resistance, water resistance and chemical resistance in various applications such as an automobile, and also the cured products thereof.

2. Brief Description of Related Technology

Conventionally, connection part of a flange in an automobile engine or two connection parts of openings and the like have been sealed by adhesive strength after curing a condensation type of uncured liquid silicone rubber directly applied to the flange by a robot. The process can been automatically conducted in line, independently of a shape or surface irregularity in a flange, and thus provide advantages in quality and a cost which have not been achieved by a conventional fixed-form gasket.

However, silicone rubbers generally exhibit inadequate engine-oil resistance. Thus, some measures such as addition of mineral powders has been taken, but it may cause deterioration in elongation property that is unique to silicone rubbers (see Japanese published examined application 62-127348). Furthermore, a silicone rubber exhibiting not only engine-oil resistance but also long life coolant resistance (LLC resistance) has been strongly needed in view of structural problems associated with recent size reduction in an engine. It has been, however, very difficult to develop such a silicone rubber. Thus, a satisfactory product has not been achieved.

Conventionally, a silicone rubber composition has been thermally cured by peroxide-curing method where the composition is cured in combination with organic peroxide such as dicumyl peroxide or by addition-curing method where a platinum catalyst is used. However, in peroxide curing, curing inhibition occurs under oxygen atmosphere, while in addition curing, the platinum catalyst is poisoned when it is in contact with a material containing an amine and/or sulfur, leading to curing inhibition.

SUMMARY OF THE INVENTION

In view of these problems, this invention provides a silicone resin composition which can provide a silicone cured rubber exhibiting a higher elongation percentage as well as improved heat resistance, oil resistance and chemical resistance, which are needed particularly in automobile application.

A first aspect of this invention relates to a silicone resin composition in which 100 wt parts of Component (a): an OH-containing polysiloxane, 0.1 to 200 wt parts of Component (b): a carbodiimide, and Component (c): an organosilicon crosslinking agent are mixed.

A second aspect of this invention relates to a silicone resin composition in which 100 wt parts of Component (a): OH-containing polysiloxane, 0.1 to 200 wt parts of Component (b): a carbodiimide, and Component (d): an amino-containing silane are mixed.

DETAILED DESCRIPTION OF THE INVENTION

As described above, this invention relates to a composition in which Component (a), Component (b) and at least one of Component (c) and Component (d) are mixed. In this invention, components in the composition may remain unchanged after they are mixed. Or in many cases, the reaction may occur when the components are mixed or after mixing of the components until use. The composition of the invention includes both of these states as far as the components are "mixed". As described later, the composition may be used as composition set where all the components may be divided into at least two packs. In such a case, the term "mixed" may also encompass both case where compounds remain unchanged as mixed and the case where compounds have been subject to reaction more or less after mixing.

Description of Component (a)

An OH-containing polysiloxane as Component (a) is preferably a polysiloxane having at least two OH groups which is liquid for mixing with other components. A preferred OH-containing polysiloxane is represented by general formula (I):

(I)

where $R^1$, $R^2$ and $R^3$ are independently H, OH or monovalent hydrocarbon group optionally substituted with fluorine, in addition, $R^1$s and $R^2$s attached to different Si atoms may be different groups; $R^4$ is H or monovalent hydrocarbon group optionally substituted with fluorine. However, when $R^4$ is monovalent hydrocarbon group optionally substituted with fluorine, at least one of all $R^1$s and $R^2$s and $R^3$ is OH. n is selected such that a desired viscosity generally within 10 to 10,000,000 cps is provided at 25° C.

Thus, the polysiloxane represented by formula (I) comprises at least one OH group, preferably two or more OH groups.

Monovalent hydrocarbon group optionally substituted with fluorine for $R^1$ to $R^4$ may include linear or cyclic aliphatic hydrocarbon group having up to 20 carbon atoms, aryls and these in which at least one hydrogen is replaced with fluorine. Preferable examples include alkyls having up to 12, preferably up to 8 carbon atoms such as methyl, ethyl, propyl, n-butyl, s-butyl, t-butyl, hexyl and octyl; cycloalkyls having 6 to 12 carbon atoms such as cyclohexyl and cyclopentyl; alkenyls having up to 12, preferably up to 8 carbon atoms such as vinyl and allyl; aryls such as phenyl, methylphenyl, ethylphenyl, isopropylphenyl, xylyl, mesytyl and naphthylaryl, preferably aryls having only one benzene ring; fluoroalkyls having up to 12, preferably up to 8 carbon atoms such as 3,3,3-trifluoropropyl. Generally, those unsubstituted with fluorine are preferable because they are readily available.

A particularly preferable OH-containing polysiloxane is an OH-terminated polysiloxane in which both ends are OH groups, i.e., $R^3$ is OH and $R^4$ is H. In the polysiloxane, $R^1$ and $R^2$ are preferably H or monovalent hydrocarbon group optionally substituted with fluorine. Particularly preferably, both $R^1$ and $R^2$ are methyl, or one of $R^1$ and $R^2$ is methyl while the other is phenyl or H. Most preferably, both $R^1$ and $R^2$ are methyl.

The OH-containing polysiloxanes may be used alone or in combination of two or more.

A viscosity of an OH-containing polysiloxane used in this invention (or "n" in formula (I)) is generally within a range of 10 cps to 10,000,000 cps, particularly 100 to 1,000,000 cps, more particularly 1,000 to 100,000, but not limited to these ranges as long as the compound is liquid such that it can be mixed with other components. When the polysiloxane is represented by formula (I), "n" is selected such that a viscosity range described above can be achieved.

Description of Component (b)

Component (b) is a compound comprising at least one carbodiimide moiety (—N═C═N—), including mono carbodiimides and polycarbodiimides.

Carbodiimide is a known compound, which can be used as prepared by a well-known process. For example, it may be prepared from a variety of isocyanates by decarboxylation-condensed reaction in neat or in an inert solvent using an organophosphorous or organometallic compound as a catalyst.

Examples of a monocarbodiimide include dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide and di-β-naphthylcarbodiimide. Among these, dicyclocarbodiimide and diisopropylbenzenecarbodiimide are particularly suitable because of their industrial availability.

A polycarbodiimide may be selected from those prepared by any of various known processes. Examples include polycarbodiimides prepared basically by a conventional process for preparing a polycarbodiimide (see U.S. Pat. No. 2,941,956; Japanese published examined application No. 47-33279; *J. Org. Chem.*, 28, 2069–2075 (1963); *Chemical Review*, Vol. 81, No. 4, pp. 619–621 (1981), specifically by decarboxylation-condensation reaction of an organic phosphorous diisocyanate.

In the above process, examples of an organic diisocyanate as a starting material for a polycarbodiimide include aromatic diisocyanates, aliphatic diisocyanates, alicyclic diisocyanates and their mixtures; specifically, 1,5-naphthalenediisocyanate, 4,4'-diphenylmethanediisocyanate, 4,4'-diphenyldimethylmethanediisocyanate, 1,3-phenylenediisocyanate, 1,4-phenylenediisocyanate, 2,4-tolylenediisocyanate, 2,6-tolylenediisocyanate, a mixture of 2,4-tolylenediisocyanate and 2,6-tolylenediisocyanate, hexamethylenediisocyanate, cyclohexane-1,4-diisocyanate, xylylenediisocyanate, isophoronediisocyanate, dicyclohexylmethane-4,4'-diisocyanate, methylcyclohexanediisocyanate, tetramethylxylylenediisocyanate, 2,6-diisopropylphenylisocyanate, 1,3,5-triisopropylbenzene-2,4-diisocyanate, 3,3'-dimethylbiphenylene-4,4'-diisocyanate, 1,3-xylenediisocyanate, dicyclohexylmethane-2,4'-diisocyanate and ethylenediisocyanate.

A polycarbodiimide prepared by the above-mentioned reaction has isocyanate groups as end groups of molecule. In this invention, both polycarbodiimides having such isocyanate end-group and polycarbodiimides having modified isocyanate group as end groups may be used.

For example, end-group of a polycarbodiimide prepared from a diisocyanate may be reacted with a monoisocyanate to give a compound having a modified isocyanate group at the end of molecule, which may be also used in this invention. Examples of such a monoisocyanate which is used for modifying end-group of a polycarbodiimide include phenylisocyanate, tolylisocyanate, dimethylphenylisocyanate, cyclohexylisocyanate, butylisocyanate, naphthylisocyanate and methylisocyanate.

Additional compounds which can be reacted with an end-isocyanate group as an end modifier include aliphatic, aromatic and alicyclic compounds including those having —OH group such as methanol, ethanol, phenol, cyclohexanol, N-methylethanolamine, polyethyleneglycol monomethyl ether and polypropyleneglycol monomethyl ether; those having ═NH group such as diethylamine and dicyclohexylamine; those having —NH$_2$ such as butylamine and cyclohexylamine; those having —COO group such as succinic acid, benzoic acid and cyclohexanoic acid; those having —SH such as ethyl mercaptan, allyl mercaptan and thiophenol; and those having epoxy.

The above decarboxylation-condensation reaction of the above-mentioned organic diisocyanate proceeds in the presence of a carbodiimidation catalyst. Examples of such a carbodiimidation catalyst include phospholenes such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide, 1-ethyl-2-phospholene-1-sulfide and 1,3-dimethyl-2-phospholene-1-sulfide; metal-carbonyl complexes such as pentacarbonyliron, nonacarbonyliron and hexacarbonyltungsten; acetylacetonite complexes of iron, aluminum, chromium or zirconium; and phosphates such as trimethyl phosphate, triethyl phosphate and triphenyl phosphate. Among these, 3-methyl-1-phenyl-2-phospholene-1-oxide is suitable in the light of reactivity.

The above carbodiimidation catalysts may be used alone or in combination of two or more. Its amount is preferably 30 wt parts or less, preferably 0.01 to 10 wt parts to 100 wt parts of the organic diisocyanate.

Carbodiimidation of an organic polyisocyanate may be conducted neat or in an appropriate solvent. When using a solvent, any solvent may be used as long as it can dissolve a polycarbodiimide resin during synthesis; for example, halogenated hydrocarbons such as 1,1-dichloroethane, tetrachloroethylene and p-chlorobenzene; ethers such as tetrahydrofuran, dioxane and diethyleneglycol dimethyl ether; ketones such as 2-methylcyclohexanone, cyclohexanone, cycloheptanone and 2,4-dimethyl-3-heptanone; aromatic hydrocarbons such as benzene, toluene and ethylbenzene; and acetates such as 2-methoxyethyl acetate and diethyleneglycol monomethyl ether acetate.

Suitable examples of a polycarbodiimide include aqueous-based carbodiimides such as V-02, V-04, V-06, E-01 and E-02 under a trademark of "Carbodilite" (Nisshinbo Industries, Inc.) and oil-based carbodiimides such as V-01, V-03, V-05, V-07 and V-09. These products are different in a main chain structure, a end-group structure, the number of a carbodiimide moiety in one molecule and a dilution percentage, and can be appropriately selected for use.

Carbodiimides may be used alone or in combination of two or more.

Although a small amount of Component (b): a carbodiimide may correspondingly improve physical properties, engine oil resistance and long life coolant resistance of a cured resin product, an amount for obtaining substantial effect is preferably 0.1 wt part or more, more preferably 1 wt part or more to 100 wt parts of Component (a): OH-containing polysiloxane. Component (b) may be used in a large amount as long as it is compatible with Component (a), and preferably 200 wt parts or less, particularly 100 wt parts or less, more particularly 50 wt parts or less to 100 wt parts of Component (a). Component (b) is, therefore, generally used within a range of 0.1 to 200 wt parts to 100 wt parts of Component (a).

Description of Component (c) and a First Aspect of the Invention

The first embodiment of this invention relates to a composition in which Component (c): organosilicon crosslinking agent is mixed in addition to the above Components (a) and Component (b).

Suitable organosilicon crosslinking agents may be those known as a curing agent for a condensation type of one-pack type liquid silicone rubber. These curing agents are such compounds that a carboxylic acid, an alcohol, an oxime, an amine, an amide, an aminoxy, a ketone, a hydrogen molecule or water is eliminated when used for one-pack type silicone rubbers and subjected to curing/condensation by moisture.

Such an organosilicon crosslinking agent may be, for example, represented by general formula (II):

(II)

where $X^1$ are independently H, OH, alkoxy, oximo, alkenoxy, amino, amide, aminoxy or acyloxy; $X^2$ are independently hydrocarbon group having up to about 20 carbon atoms such as $C_1$ to $C_{20}$ alkyl, $C_2$ to $C_{20}$ alkenyl, aryl having up to 20 carbon atoms or fluoroalkyl; and a is 0, 1 or 2, preferably 0 or 1.

$X^1$ is preferably a hydrolyzable group such as alkoxy, oximo, alkenoxy, amino, amide, aminoxy or acyloxy, more preferably methoxy, ethoxy, methylethylketoximo (—O—N=C(CH$_3$)C$_2$H$_5$), isopropenoxy (—O—C(CH$_3$)=CH$_2$), cyclohexylamino (—NH-cyclohexyl), alkylcarbonyl-N-alkylamino (methylcarbonyl-N-methylamino [—NR—C(O)R] etc.; R is alkyl), dialkylaminoxy (dimethylaminoxy, etc.). $X^2$ is preferably $C_1$ to $C_8$ alkyl, $C_2$ to $C_8$ alkenyl or phenyl, more preferably methyl, ethyl and vinyl.

Preferable organosilicon crosslinking agents may further include cyclic aminoxysiloxanes where an aminoxy group is attached to Si in the cyclic siloxane, including a diorganoaminoxysiloxane represented by formula (III):

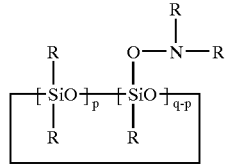
(III)

where R, which may be the same or different, are alkyl such as methyl and ethyl or aryl; q is about 3 to 10; and p is an integer meeting an equation $0 \leq p \leq q-2$, preferably $0 \leq p \leq q-3$, and a diorganodiamonosiloxane represented by formula (IV):

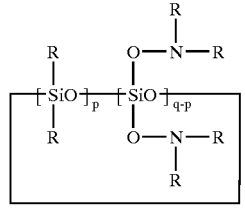
(IV)

where R, which may be the same or different, are alkyl such as methyl and ethyl, or aryl; q is about 3 to 10; and p is an integer meeting an equation $0 \leq p \leq q-1$, preferably $0 \leq p \leq q-2$.

In formulas (III) and (IV), q is typically 4 and at the same time p is 0, 1 or 2. These may be used as a mixture. R, attached to Si and to N, may be the same or different, preferably methyl, ethyl or phenyl, and more preferably, at least R attached to Si is methyl.

Examples of an organosilicon crosslinking agent include methyltriacetoxysilane, vinyltriacetoxysilane, methyltri alkoxysilanes (e.g., methyltrimethoxysilane), vinyltrialkoxysilanes (e.g., vinyltrimethoxysilane), methyltri(methylethylketoximo)silane, vinyltri(methylethylketoximo)silane, tetra(methylethylketoximo)silane, methyltri(cyclohexylamino)silane, methyltri(isopropenoxy)silane, vinyltri(isopropenoxy)silane, dimethylamidosilanes (e.g., methylcarbonyl-N-ethylaminodimethylsilane), methylvinyldiamidosilanes (e.g., methylcarbonyl-N-ethylaminomethylvinylsilane).

Component (c) may include one compound or a mixture of two or more.

Component (c) may be used in an amount sufficient to initiate crosslinking curing, particularly curing by moisture. A too small amount of Component (c) may lead to insufficient curing or even if curing is initiated a product may exhibit poor storage stability. On the other hand, an excessive amount may cause significant delay of curing, leading to problems in practical use. Thus, Component (c) is generally used in an amount of 0.01 wt parts to 50 wt parts, preferably 0.1 wt parts to 20 wt parts on the basis of 100 wt parts of Component (a).

According to a silicone resin composition of the first aspect of the invention, Components (a), (b) and (c) are mixed, in which at least a portion of each of Components (a), (b) and (c) may change chemically due to reaction among the components after blending as described above. For example, it is considered that OH-containing polysiloxane as Component (a) may react with an organosilicon crosslinking agent as Component (c) to form a product in which the organosilicon crosslinking agent is attached to the siloxane end. The present invention covers all cases where the reaction may not proceed at all, or it may proceed partially or completely, depending on the types of components and conditions.

In addition, the reaction of a carbodiimide in this system may not be clearly known to the inventors, and thus this invention covers both cases where the reaction occurs and does not occur.

The silicone resin composition according to the first aspect is preferably cured in the presence of moisture to give a rubbery cured product.

The silicone resin composition may, if necessary, contain additional agents such as a curing catalyst, a filler and an adhesion promoter, and these may be blended using a commonly used kneader. However, after adding a crosslinking agent, curing may be initiated by moisture in the air. The inside of the kneader may be under nitrogen atmosphere, and when storing the silicone resin composition in a container, the container may be tightly sealed.

With respect to curing conditions, those for curing a common condensation type of one-pack type silicone resin composition is used. For example, the components may be cured at a temperature of 100° C. or lower, preferably 80° C. or lower, more preferably 60° C. or lower and, for example, −10° C. or higher, preferably 0° C. or higher, and at a humidity of 10% to 100% for 0.1 to 240 hours. Generally, curing may be conducted under a common atmosphere at room temperature or an ambient temperature.

Physical properties of a silicone cured composition may be improved by adding, if necessary, a known filler such as fumed silica, surface-treated fumed silica, precipitated silica, diatomaceous earth, quartz powder, calcium carbonate, carbon black, magnesium oxide, titanium dioxide, iron oxide, silicate of iron or aluminum (or complex oxides), and further, an adhesion promoter such as a silane coupling agent and a curing accelerator such as organotin compounds, organotitanium compounds and amines.

Component (d) described later may be added to the silicone resin composition according to the first aspect, but a major part of Component (d) may often act as an silane coupling agent when the composition is cured by moisture.

Components (a) to (c) and optional materials as needed are blended until use at latest. Specifically, the composition may be stored or delivered as a one pack type. Alternatively, it may be divided into two or more packs as a two- or three-pack type for storage. Particularly, when curing proceeds rapidly, the composition is preferably divided as a two- (or more) pack type for storage or delivery. The way of division may be determined depending on expected purpose. For example, the composition may be a two-pack type, in which one pack contains Components (a) and (b) and the other pack contains Components (a) and (c). Before using, these packs is kneaded, as necessary, by a static mixer or dynamic mixer and then the mixture is cured according to the above-mentioned condition.

Description of Component (d) and a Second Aspect of the Invention

According to the second aspect, this invention provides a composition in which Component (d): an amino-containing silane is mixed in addition to above Components (a) and (b).

Component (d) is a curing agent used for curing a mixture of Components (a) and (b) by heating; for example, amino-containing silane coupling agent or silazanes are used. Preferable amino-containing silane coupling agents are compounds having a primary or secondary amino group directly attached to Si or linked to Si via an alkylene linker and an alkoxy group directly attached to Si.

Examples of a silazane include linear silazanes and cyclic silazanes. A linear silazane may be, for example, a compound represented by general formula:

where R is H or alkyl; r is 0 or an integer of 1 or more, and up to about 10. Preferably, R is H or methyl, and r is 0 or 2. A cyclic silazane may be, for example, a compound represented by formula:

where R is H or alkyl; and r is an integer of 3 or more, and up to about 10. Preferably, R is H or methyl and r is typically 4.

Examples of an amino-containing silane which can be also used as Component (d) include 3-[N-allyl-N(2-aminoethyl)]aminopropyltrimethoxysilane, P-[N-(aminoethyl)aminomethyl]phenetyltrimethoxysilane, N-(2-aminoethyl)-3-aminopropylmethyldimethoxysilane, N-(2-aminoethyl)-3-aminopropylmethyldimethoxysilane, N-(2-aminoethyl)-3-aminopropyltrimethoxysilane, 1-(3-aminopropyl)-1,1,3,3,3-pentamethyldisiloxane, 3-aminopropyltriethoxysilane, 3-aminopropyltris(trimethylsiloxy)silane, α,ω-bis(3-aminopropyl)polydimethylsiloxane, 1,3-bis(3-aminopropyl)-1,1,3,3-tetramethyldisiloxane, 1,3-bis(chloromethyl)-1,1,3,3-tetramethyldisilazane, N,N-bis[(methyldimethoxysilyl)propyl]amine, N,N-bis[3-(methyldimethoxysilyl)propyl]ethylenediamine, N,N-bis[3-(trimethoxysilyl)propyl]amine, N,N-bis[3-(trimethoxysilyl)propyl]ethylenediamine, hexamethylcyclotrisilazane, hexamethyldisilazane, octamethylcyclotetrasilazane, tetramethyldisilazane, N-[(3-trimethoxysilyl)propyl]diethylenetriamine, N-[(3-trimethoxysilyl)propyl]triethylenetetramine, N-3-trimethoxysilylpropyl-m-phenylenediamine, N-trimethylsilylacetamide and N-trimethylsilylphenylurea, which may be used alone or in combination of two or more.

Component (d) may be used in an amount at least to cure by heating a composition comprising Components (a), (b) and (d). Since a too smaller amount may lead to insufficient curing, the amount is generally 0.01 wt parts or more, preferably 0.1 wt parts or more on the basis of 100 wt parts of Component (a). An excessive amount may considerably deteriorate physical properties of a cured product obtained. Thus, the amount is to 100 wt parts or less, preferably 50 wt parts or less on the basis of 100 parts of Component (a). It is, therefore, generally 0.01 wt parts to 100 wt parts, preferably 0.1 wt parts to 50 wt parts to 100 wt parts of Component (a).

According to the silicone resin composition of the second aspect of the invention, Components (a), (b) and (d) are mixed, in which at least a part of each of Components (a), (b) and (d) may change chemically due to reaction among the components after blending as described above. For example, when Component (d) is a silane coupling agent, its alkoxy moiety may react with an OH-containing polysiloxane of Component (a). The present invention covers all cases where the reaction may not proceed at all, or it may proceed partially or completely, depending on the types of components and conditions.

In addition, the reaction of a carbodiimide may not be clearly known to the inventors, and thus this invention covers both cases where the reaction occurs and does not occur.

The silicone resin composition of the second aspect is cured by heating to provide a rubbery cured product.

The silicone resin composition may, if necessary, contain additional agents such as a curing catalyst, a filler and an adhesion promoter, and these may be blended using a commonly used kneader.

Curing may be conducted at a temperature of generally 25° C. or higher, preferably 40° C. or higher, for example 50° C. or higher and generally 250° C. or lower, preferably 200° C. or lower for 0.1 to 24 hours.

For the silicone resin composition of the second aspect, as described for the first aspect, physical properties of the cured silicone composition may be improved by adding, if necessary, a known filler such as fumed silica, surface-treated fumed silica, precipitated silica, diatomaceous earth, quartz powder, calcium carbonate, carbon black, magnesium oxide, titanium dioxide, iron oxide, silicate of iron or aluminum (or complex oxides), and further, an adhesion promoter such as a silane coupling agent and a curing accelerator such as organotin compounds, organotitanium compounds and amines.

Components (a), (b) and (d) and optional materials as needed are blended until use. Specifically, the composition may be stored or delivered as a one pack type, or alternatively may be divided into two or more packs as a two- or three-pack type for storage. Particularly, when curing may proceed rapidly, the composition is preferably divided as a two- (or more) pack type for storage or delivery. The way of division may be determined depending on an expected purpose. For example, the composition may be a two-pack type, in which one pack contains Components (a) and (b) and the other pack contains Components (a) and (d). Before using, these packs may be kneaded, as necessary, by a static mixer or dynamic mixer and then the mixture is cured according to the above-mentioned condition.

EXAMPLES

This invention will be more specifically described with reference to Examples.

Engine Oil Immersion Test

This test was conducted in accordance with JIS K6258. In a glass vessel was placed 1000 cc of Mobil 1 turbo 15W-50 SJ/CF (Mobil Oil Corporation). Samples of silicone cured product were prepared in the shape of dumbbell type 3 as described in Examples and Comparative Examples. Three samples out of each Example and Comparative Example were immersed in the liquid for testing.

The glass vessel was allowed to be immersed in an oil bath at 150° C.

The liquid for testing was removed and the variation in tensile strength and hardness of the samples were determined within three minutes.

Long Life Coolant Immersion Test

This test was in accordance with JIS K6258. In a glass vessel was placed 1000 cc of Diaqueen Super Long Life (Mitsubishi Motors Corporation). Samples of silicone cured product were prepared in the shape of dumbbell type 3 as described in Examples and Comparative Examples. Three samples out of each Example and Comparative Example were immersed in the liquid for testing.

The glass vessel was allowed to be immersed in an oil bath at 120° C.

The liquid for testing was removed and the variation in tensile strength and hardness of the samples were determined within three minutes.

Composition According to a First Aspect of the Invention (Condensation Type)

Examples 1 to 3

Into a five liter universal kneader (Dalton Co. Ltd.) were charged an OH-terminated polydimethylsiloxane with 20,000 cp and an OH-terminated polydimethylsiloxane with 6,000 cp as Component (a) (weight ratio: 70:30), Cab-O—Si TS530 (Cabot Co. Ltd.) as a silica, calcium carbonate, carbon black, and iron-aluminum silicate in the amounts listed in Table 1, and the mixture was kneaded for one hour. Then, the mixture was heated to 120° C. and then kneaded for further one hour.

After cooling and nitrogen replacement of the atmosphere, to the mixture were further added tetra(methylethylketoximo)silane and vinyltri(methylethylketoximo)silane as Component (c), a polycarbodiimide (Carbodilite V-04B; (Nisshinbo Industries, Inc.) as Component (b), and 3-aminopropyltriethoxysilane in the amounts listed in Table 1, and the resulting mixture was kneaded for one hour at 25° C. to give a silicone resin composition.

Then, 55 g of the silicone rubber composition was charged into a Teflon® coated mold having a 15 cm×15 cm×0.2 cm cavity, on which a release sheet was placed and on the sheet was placed a flat-plate mold. The composition was pressed at a pressure of 100 kgf/cm² at room temperature using a press machine. After pressure release, the flat-plate mold was removed. The silicone resin composition was cured in a thermo-hygrostat at a temperature of 25° C. and a humidity of 65% to give a cured rubber.

A tensile test for the cured rubber was conducted using a dumbbell-3 type sample in accordance with JIS K6251 and hardness test was conducted in accordance with JIS K6253. Table 2 shows the measured physical properties.

TABLE 1

Condensation-curable type silicone resin composition

| Components | Example 1 | Example 2 | Example 3 |
|---|---|---|---|
| OH-terminated PDMS | 1000.0 g | 1000.0 g | 1000.0 g |
| Silica | 390.0 g | 390 g | 390.0 g |
| Calcium carbonate | 480.0 g | 480 g | 480.0 g |
| Carbon black | 6.0 g | 6.0 g | 6.0 g |
| Iron-aluminum silicate | 450.0 g | 450.0 g | 450.0 g |
| Tetra(methyl-ethylketoximo)silane | 30.0 g | 30 g | 30.0 g |
| Vinyltri(methyl-ethylketoximo)silane | 150.0 g | 150 g | 150.0 g |
| Polycarbodiimide | 120.0 g | 10 g | 800 g |
| 3-Aminopropyltriethoxysilane | — | 22.5 g | 22.5 g |

PDMS: polydimetylsiloxane

TABLE 2

Physical properties and variation in the immersion test for silicone cured rubbers

| Physical Properties | Example 1 | Example 2 | Example 3 |
|---|---|---|---|
| Initial physical properties | | | |
| Hardness (Duro A) | 47 | 48 | 52 |
| Tensile strength (MPa) | 3.8 | 3.0 | 3.6 |
| Elongation (%) | 330 | 300 | 360 |
| Variation in an engine oil immersion test | | | |
| Variation in hardness (Point) | −9 | −3 | −12 |
| Variation in tensile strength (%) | −5 | −9 | −12 |
| Variation in elongation (%) | 0 | +8 | +20 |
| Variation in a long life coolant immersion test | | | |
| Variation in hardness (Point) | −12 | −6 | −20 |
| Variation in tensile strength (%) | −38 | −12 | −40 |
| Variation in elongation (%) | +30 | +29 | +35 |

Comparative Examples 1 to 3

Silicone resin compositions were prepared as described in Examples 1 to 3 except that formulations shown in Table 3 were used, and cured rubbers were provided as described above. Table 4 shows the measured physical properties.

TABLE 3

Condensation-curable type silicone resin composition

| Components | Comp. Ex. 1 | Comp. Ex. 2 | Comp. Ex. 3 |
|---|---|---|---|
| OH-terminated PDMS | 1000.0 g | 1000.0 g | 1000.0 g |
| Silica | 390.0 g | 390 g | 390.0 g |
| Calcium carbonate | 480.0 g | 480 g | 480.0 g |
| Carbon black | 6.0 g | 6.0 g | 6.0 g |
| Iron-aluminum silicate | 450.0 g | 450.0 g | 450.0 g |
| Tetra(methyl-ethylketoximo)silane | 30.0 g | 30 g | 30.0 g |
| Vinyltri(methyl-ethylketoximo)silane | 150.0 g | 150 g | 150.0 g |
| Polycarbodiimide | — | 0.05 g | 3000.0 g |
| 3-Aminopropyltriethoxysilane | — | — | 22.5 g |

TABLE 4

Physical properties and variation in the immersion test for silicone cured rubbers

| Physical Properties | Comp. Ex. 1 | Comp. Ex. 2 | Comp. Ex. 3 |
|---|---|---|---|
| Initial physical properties | | | |
| Hardness (Duro A) | 46 | 47 | 20 |
| Tensile strength (MPa) | 3.8 | 3.5 | 1.0 |
| Elongation (%) | 160 | 140 | 80 |
| Variation in an engine oil immersion test | | | |
| Variation in hardness (Point) | −24 | −22 | −13 |
| Variation in tensile strength (%) | −72 | −83 | −90 |
| Variation in elongation (%) | +88 | +80 | +198 |
| Variation in a long life coolant immersion test | | | |
| Variation in hardness (Point) | −33 | −42 | −15 |
| Variation in tensile strength (%) | −72 | −89 | −88 |
| Variation in elongation (%) | +250 | +230 | +300 |

Composition According to a Second Aspect of the Invention (Thermosetting Type)

Examples 4 to 7

Into a five liter universal kneader (Dalton Co. Ltd.) were charged an OH-terminated polydimethylsiloxane with 20,000 cp and an OH-terminated polydimethylsiloxane with 6,000 cp as Component (a) (weight ratio: 70:30), Cab-O—Si TS530 (Cabot Co. Ltd.) as a silica, calcium carbonate, carbon black, and iron-aluminum silicate in the amounts listed in Table 5, and the mixture was kneaded for one hour. Then, the mixture was heated to 120° C. and then kneaded for further one hour.

After cooling, to the mixture were further added a polycarbodiimide (Carbodilite V-04B) as Component (b) and 3-aminopropyltriethoxysilane or N,N-bis[(methyldimethoxysilyl)propyl]amine as Component (d) in the amounts listed in Table 5, and the resulting mixture was kneaded for one hour at 25° C. to give a silicone rubber composition.

Then, 55 g of the silicone rubber composition was charged into a Teflon® coated mold having a 15 cm×15 cm×0.2 cm cavity, on which a flat-plate mold was placed. The composition was pressed at a pressure of 100 kgf/cm² at 80° C. using a press. The silicone resin composition was cured to give a cured rubber.

Physical properties were determined as described in Examples 1 to 3. The results are shown in Table 6.

TABLE 5

Thermosetting type silicone resin composition

| Components | Ex. 4 | Ex. 5 | Ex. 6 | Ex. 7 |
|---|---|---|---|---|
| OH-terminated PDMS | 1000.0 g | 1000.0 g | 1000.0 g | 1000.0 g |
| Silica | 390.0 g | 390 g | 390.0 g | 390.0 g |
| Calcium carbonate | 480.0 g | 480 g | 480.0 g | 480.0 g |
| Carbon black | 6.0 g | 6.0 g | 6.0 g | 6.0 g |
| Iron-aluminum silicate | 450.0 g | 450.0 g | 450.0 g | 450.0 g |
| Polycarbodiimide | 1.0 g | 50 g | 1000 g | 50 g |
| 3-Aminopropyltriethoxysilane | 5 g | 90 g | — | — |
| N,N-bis[(methyldimethoxysilyl)propyl]amine | — | — | 50 | 350 |

TABLE 6

Physical properties and variation in the immersion test for silicone cured rubbers

| Physical Properties | Ex. 4 | Ex. 5 | Ex. 6 | Ex. 7 |
|---|---|---|---|---|
| Initial physical properties | | | | |
| Hardness (Duro A) | 37 | 38 | 40 | 32 |
| Tensile strength (MPa) | 3.5 | 3.0 | 4.8 | 2.6 |
| Elongation (%) | 450 | 420 | 500 | 400 |
| Variation in an engine oil immersion test | | | | |
| Variation in hardness (Point) | −12 | −5 | +3 | −3 |
| Variation in tensile strength (%) | −22 | −18 | −8 | −25 |
| Variation in elongation (%) | −30 | +5 | +12 | +16 |
| Variation in a long life coolant immersion test | | | | |
| Variation in hardness (Point) | −18 | −14 | −10 | −18 |
| Variation in tensile strength (%) | −30 | −20 | −28 | −33 |
| Variation in elongation (%) | +24 | +38 | +33 | +20 |

Comparative Examples 4 to 8

Silicone resin compositions were prepared as described in Examples 4 to 7, except that the formulations shown in Table 7 were used. Although attempted to cure the composition, Comparative Example 4, 5 or 6 did not give a cured product. Comparative Examples 7 and 8 gave cured rubbers. Table 8 shows the measured physical properties.

TABLE 7

Condensation cured silicone resin composition

| Components | Comp. Ex. 4 | Comp. Ex. 5 | Comp. Ex. 6 | Comp. Ex. 7 | Comp. Ex. 8 |
|---|---|---|---|---|---|
| OH-terminated PDMS | 1000.0 g | 1000.0 g | 1000.0 g | 1000.0 g | 1000.0 g |
| Silica | 390.0 g | 390 g | 390.0 g | 390.0 g | 390.0 g |
| Calcium carbonate | 480.0 g | 480 g | 480.0 g | 480.0 g | 480.0 g |
| Carbon black | 6.0 g | 6.0 g | 6.0 g | 6.0 g | 6.0 g |
| Iron-aluminum silicate | 450.0 g | 450.0 g | 450.0 g | 450.0 g | 450.0 g |
| Polycarbodiimide | — | 50.0 g | 3000.0 g | 50.0 g | 3000.0 g |
| 3-Aminopropyltriethoxysilane | 50.0 g | — | — | 1200 g | 50.0 g |

TABLE 8

Physical properties and variation in the immersion test for silicone cured rubbers

| Physical Properties | Comp. Ex. 4 | Comp. Ex. 5 | Comp. Ex. 6 | Comp. Ex. 7 | Comp. Ex. 8 |
|---|---|---|---|---|---|
| Initial physical properties | | | | | |
| Hardness (Duro A) | Not cured | Not cured | Not cured | 8 | 15 |
| Tensile strength (MPa) | | | | 0.5 | 0.8 |
| Elongation (%) | | | | 180 | 50 |
| Variation in an engine oil immersion test | | | | | |
| Variation in hardness (Point) | Not cured | Not cured | Not cured | −6 | −12 |
| Variation in tensile strength (%) | | | | −98 | −88 |
| Variation in elongation (%) | | | | −89 | −90 |
| Variation in a long life coolant immersion test | | | | | |
| Variation in hardness (Point) | Not cured | Not cured | Not cured | −5 | −13 |
| Variation in tensile strength (%) | | | | −80 | −75 |
| Variation in elongation (%) | | | | −83 | −90 |

As described above, a silicone resin composition comprising a carbodiimide according to this invention can provide a silicone resin composition which gives a silicone cured rubber exhibiting a higher elongation percentage, improved heat resistance, oil resistance, chemical resistance and aging resistance which are particularly required in automobile applications.

What is claimed is:

1. A silicone resin composition comprising:
   100 wt parts of Component (a): an OH-containing polysiloxane;
   0.1 to 200 wt parts of Component (b): a carbodiimide; and
   Component (d): an amino group-containing silane.

2. The composition as claimed in claim 1 wherein the amount of Component (d) is 0.01 to 100 wt parts to 100 wt parts of Component (a).

3. The composition as claimed in claim 1 wherein the OH-containing polysiloxane is a polysiloxane represented by general formula (I):

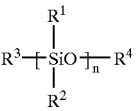

(I)

wherein $R^1$, $R^2$ and $R^3$ are independently selected from the group consisting of H, OH and monovalent hydrocarbon groups optionally substituted with fluorine, in addition, $R^1$s and $R^2$s attached to different Si atoms may be different groups; $R^4$ is selected from the group consisting of H and monovalent hydrocarbon groups optionally substituted with fluorine; provided that when $R^4$ is a monovalent hydrocarbon group optionally substituted with fluorine, at least one of all $R^1$s and $R^2$s and $R^3$ is OH; n is selected such that a viscosity at 25° C. is within the range of 10 to 10,000,000 cps.

4. The composition as claimed in claim 3 wherein the OH-containing polysiloxane is an OH-terminated polysiloxane which is represented by formula (I) in which $R^1$ and $R^2$ are H or monovalent hydrocarbon group, $R^3$ is OH, and $R^4$ is H.

5. The composition as claimed in claim 3 wherein the OH-containing polysiloxane is an OH-terminated polydimethylsiloxane which is represented by formula (I) in which $R^1$ and $R^2$ are methyl, $R^3$ is OH, and $R^4$ is H.

6. The composition as claimed in claim 1 wherein the carbodiimide is a polycarbodiimide.

7. The composition as claimed in claim 1 wherein the amino-containing silane is a silazane or an amino-containing silane coupling agent.

8. A silicone resin cured product prepared by thermally curing the composition as claimed in claim 1.

9. A multi-pack silicone resin composition set which are stored as two or more divided packs which are mixed before use to give the composition as claimed in claim 1.

* * * * *